June 26, 1923.

C. L. LA JEUNESSE

ILLUMINATING DEVICE

Filed Aug. 18, 1921

1,460,136

INVENTOR.
Clifford L. La Jeunesse
BY
Bottum, Hudnall, Pecher & McNamara
ATTORNEYS.

Patented June 26, 1923.

1,460,136

UNITED STATES PATENT OFFICE.

CLIFFORD L. LA JEUNESSE, OF MILWAUKEE, WISCONSIN.

ILLUMINATING DEVICE.

Application filed August 18, 1921. Serial No. 493,494.

*To all whom it may concern:*

Be it known that I, CLIFFORD L. LA JEUNESSE, a citizen of the United States, residing at Milwaukee, in the county of Milwaukee and State of Wisconsin, have invented certain new and useful Improvements in Illuminating Devices, of which the following is a specification, reference being had to the accompanying drawing, forming a part thereof.

This invention relates to illuminating devices and the object of the invention is to improve the construction and operation of illuminating devices in the manner to be hereinafter described and claimed.

Figure 1:
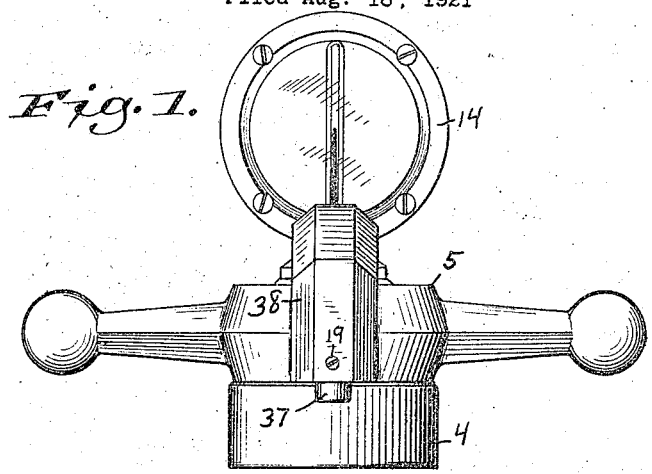
Figure 2:
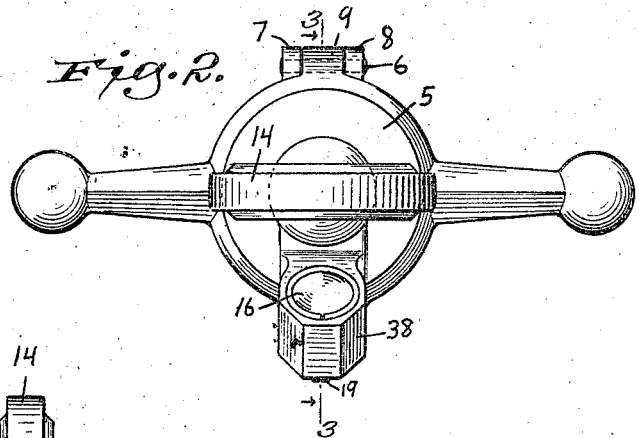
Figures 3, 4:
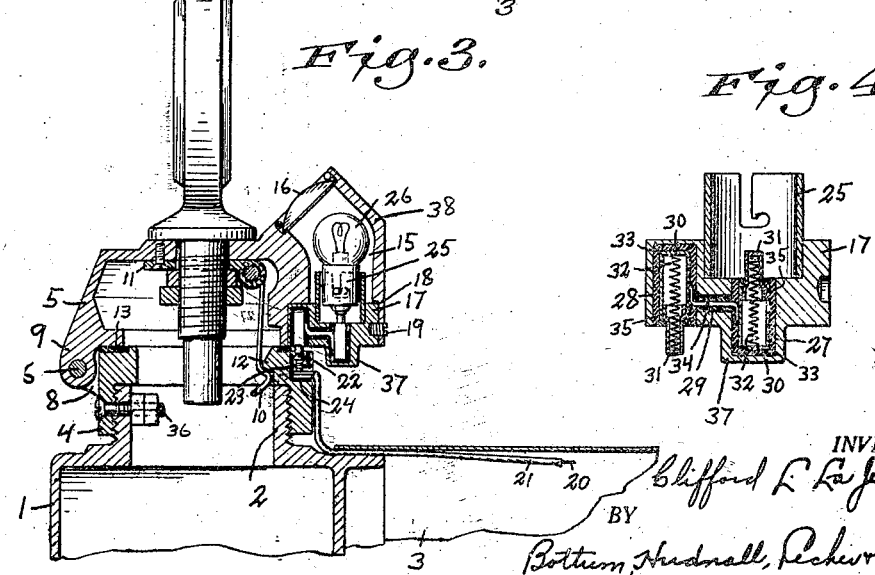

Referring to the drawings which accompany this specification and form a part hereof, which drawings illustrate an embodiment of this invention, and on which drawings the same reference characters are used to designate the same parts wherever they may appear in each of the several views, Fig. 1 is a rear elevation of the illuminating device; Fig. 2 is a plan view of the same; Fig. 3 is a vertical, longitudinal sectional view, the section being taken on the line 3—3 on Fig. 2, looking in the direction indicated by the arrows; and Fig. 4 is a vertical sectional view, on an enlarged scale, of a part of the device.

Referring to the drawings, the reference numeral 1 designates the radiator of an automotive vehicle which is provided with the screwthreaded filling nipple 2. A part 3 of the usual engine covering hood is also shown. A base 4 is screwthreaded to engage with the nipple 2 and a cap 5 is hinged to the base 4 by a hinge pin 6 which passes through lugs 7 and 8 on the base and a lug 9 on the cap 5. A spring catch 10 is secured to a plate 11 which is fastened inside the cap and the catch springs under a projection 12 to lock the cap 5 to the base 4. Packing or a gasket of any suitable kind 13 may be interposed between the cap 5 and the base 4 to make a tight joint and to prevent noise.

The device is primarily intended for use as a radiator cap for automotive vehicles and will be so described, but such description is not intended to limit the use of the device to use as a radiator cap or to use with automotive vehicles.

The reference numeral 14 designates a part or object to be illuminated and is illustrated as a thermometer device which is intended to be viewed over the hood 3. The cap 5 is provided at its rear with a lamp receiving aperture 15 which may be, and preferably is, provided with a lens 16 to concentrate the light upon the part or object to be illuminated. A lamp holder 17 is adapted to be received within an enlarged lower part 18 of the lamp receiving aperture 15 and may be retained therein in any suitable manner as, for example, by a screw 19. The lamp holder 17 is metal and contacts with the metal cap 5 through which it is grounded to the metal of the vehicle by the hinge pin 6 and the spring catch 10, if the packing or gasket 13 should be an insulating substance. A wire 20 leads from a source of supply of electricity, is protected by insulation 21, and makes electrical contact with a clamping screw 22 which clamps the wire 20 in insulation 23 seated in a cavity 24 in the base 4. The lamp holder 17 is provided with a lamp socket 25 of metal for the lamp 26 and has an upwardly opening cavity 27 and a downwardly opening cavity 28 which are united by an opening or bore 29. Metal shells 30, which contain plungers 31 and springs 32, are seated in these cavities and insulated by insulation 33 from the surrounding metal. The insulation 33 also extends through the opening or bore 29 and a wire or wires 34 extends through the insulation and makes electrical contact with the metal shells 30. The metal shells 30 are hollow cylinders and have their outer ends crimped over to a less diameter than enlargements 35 on the plungers 31 so that the plungers will not become separated from the shells.

One of the spring-pressed plungers 31 makes contact with the ordinary base plug of the lamp 26 and the other with the clamping screw 22 so that an electric circuit is established through the wire 20, clamping screw 22, the plungers 31, shells 30, wire 34 and lamp 26 to the metal ground of the vehicle.

A bolt 36 passing through the base 4 and the radiator nipple 2 serves to properly position the lamp receiving aperture 15 with respect to the part or object to be illuminated and by upsetting the end of the bolt beyond the nuts removal of the device by children is effectively prevented.

The cap 5 can be readily swung open on the hinge pin 6 for filling the radiator and the electric circuit will be automatically reestablished, when the cap 5 is again closed, by plunger 31 contacting with the clamping screw 22.

The removable lamp holder 17 may be provided with a projection 37 to serve as a handle for removing the lamp holder.

The drawings illustrate the lamp receiving aperture 15 as formed in an off-set part 38 of the cap 5. This construction economizes metal and does not interfere with the lifting of the hood 3.

The flow of electricity through wire 20 can be controlled by a switch, not shown, which can be located in any convenient position as on the dash of the vehicle, for example.

What is claimed is:

1. In an illuminating device, the combination with a base, of a cap hinged thereto and provided with an object to be illuminated projecting above the cap, the cap being provided with a lamp receiving aperture below the object to be illuminated, a lamp holder secured to the cap, an electric conductor secured to the base and insulated therefrom, an electric conductor secured to the lamp holder and insulated therefrom, and yieldable means for establishing electrical connection between said conductors when the cap is closed.

2. In an illuminating device, the combination with a base of a cap hinged thereto and provided with an off-set part containing a lamp receiving aperture, a removable lamp holder secured to said cap and provided with an upwardly opening cavity and a downwardly opening cavity connected by a bore, electrical contact members seated in said cavities and electrically connected through said bore and insulated from said lamp holder, an electrical conductor secured to the base and insulated therefrom and arranged to be contacted by one of the electrical contact members seated in a cavity in the lamp holder.

3. In an illuminating device, the combination with a base, of a cap hinged thereto and provided with an object to be illuminated projecting above the cap, the cap being provided with a lamp receiving aperture below the object to be illuminated, a lamp holder secured to the cap, an electric conductor secured to the base and insulated therefrom, an electric conductor secured to the lamp holder and insulated therefrom and provided with yieldable means for contacting with a lamp and other yieldable means for establishing electrical connection between said conductors when the cap is closed.

4. In an illuminating device, the combination with a screwthreaded nipple, of a screwthreaded base, means to lock the base to the nipple, a cap hinged to the base and provided with a catch adapted to engage with the base to keep the cap closed, the cap being provided with an upstanding object to be illuminated and also being provided with a lamp receiving aperture below the object to be illuminated, a lamp holder secured to the cap and provided with an electrical conductor adapted to make electrical contact with a lamp, an electrical conductor secured to the base and insulated therefrom, and yieldable means for establishing electrical connection between said conductors when the cap is closed.

In witness whereof I hereto affix my signature.

CLIFFORD L. LA JEUNESSE.